United States Patent
Zhu et al.

(10) Patent No.: US 11,627,476 B2
(45) Date of Patent: Apr. 11, 2023

(54) DETERMINING BEAM TRACKING FREQUENCIES USING SIGNAL-TO-NOISE RATIOS ASSOCIATED WITH USER EQUIPMENTS

(71) Applicant: QUALCOMM Incorporated, San Diego, CA (US)

(72) Inventors: Jun Zhu, San Diego, CA (US); Yong Li, San Diego, CA (US); Raghu Narayan Challa, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/305,779

(22) Filed: Jul. 14, 2021

(65) Prior Publication Data
US 2023/0019061 A1    Jan. 19, 2023

(51) Int. Cl.
*H04W 16/28*    (2009.01)
*H04B 17/336*    (2015.01)
*H04W 72/1263*    (2023.01)

(52) U.S. Cl.
CPC .......... *H04W 16/28* (2013.01); *H04B 17/336* (2015.01); *H04W 72/1263* (2013.01)

(58) Field of Classification Search
CPC .............. H04W 16/28; H04W 72/1263; H04B 17/336
See application file for complete search history.

(56) References Cited

U.S. PATENT DOCUMENTS

| | | | |
|---|---|---|---|
| 8,532,081 B1* | 9/2013 | Narasimhan .......... | H04L 1/0001 455/452.2 |
| 2020/0366430 A1* | 11/2020 | Yu ...................... | H04L 25/03261 |
| 2020/0374960 A1* | 11/2020 | Deenoo ................ | H04W 76/19 |
| 2022/0039076 A1* | 2/2022 | Choi .................... | H04B 7/0695 |

FOREIGN PATENT DOCUMENTS

WO    2021101668 A1    5/2021

OTHER PUBLICATIONS

International Search Report and Written Opinion—PCT/US2022/072645—ISA/EPO—dated Sep. 16, 2022.

* cited by examiner

*Primary Examiner* — Harry H Kim
(74) *Attorney, Agent, or Firm* — Harrity & Harrity, LLP

(57) ABSTRACT

Various aspects of the present disclosure generally relate to wireless communication. In some aspects, a user equipment (UE) may detect a signal-to-noise ratio (SNR) associated with the UE. The UE may determine a beam tracking frequency based at least in part on the SNR. The UE may perform a beam tracking in accordance with the beam tracking frequency. Numerous other aspects are described.

30 Claims, 7 Drawing Sheets

500 ⟶

502: Low SNR (e.g., less than 5 dB)

| Beam panic mode | Ratio ($x$) of UE beam dwell time to quantity of beams pending for scheduling | Down sampling multiplier ($M$) |
|---|---|---|
| 1 | $x \geq 8$ | 8 |
| 2 | $4 \leq x < 8$ | 4 |
| 3 | $2 \leq x < 4$ | 2 |
| 4 | $0 \leq x < 2$ | 1 |

504: Medium SNR (e.g., 5-20 dB)

| Beam panic mode | Ratio ($x$) of UE beam dwell time to quantity of beams pending for scheduling | Down sampling multiplier ($M$) |
|---|---|---|
| 1 | $x \geq 4$ | 8 |
| 2 | $2 \leq x < 4$ | 4 |
| 3 | $1 \leq x < 2$ | 2 |
| 4 | $0 \leq x < 1$ | 1 |

506: High SNR (e.g., greater than 20 dB)

| Beam panic mode | Ratio ($x$) of UE beam dwell time to quantity of beams pending for scheduling | Down sampling multiplier ($M$) |
|---|---|---|
| 1 | $x \geq 1$ | 8 |
| 2 | $0.5 \leq x < 1$ | 4 |
| 3 | $0.25 \leq x < 0.5$ | 2 |
| 4 | $0 \leq x < 0.25$ | 1 |

| Beam panic mode | Ratio ($x$) of UE beam dwell time to quantity of beams pending for scheduling | Down sampling multiplier ($M$) |
|---|---|---|
| 1 | $x \geq 8$ | 8 |
| 2 | $4 \leq x < 8$ | 4 |
| 3 | $2 \leq x < 4$ | 2 |
| 4 | $0 \leq x < 2$ | 1 |

502: Low SNR (e.g., less than 5 dB)

| Beam panic mode | Ratio (x) of UE beam dwell time to quantity of beams pending for scheduling | Down sampling multiplier (M) |
|---|---|---|
| 1 | $x \geq 8$ | 8 |
| 2 | $4 \leq x < 8$ | 4 |
| 3 | $2 \leq x < 4$ | 2 |
| 4 | $0 \leq x < 2$ | 1 |

504: Medium SNR (e.g., 5-20 dB)

| Beam panic mode | Ratio (x) of UE beam dwell time to quantity of beams pending for scheduling | Down sampling multiplier (M) |
|---|---|---|
| 1 | $x \geq 4$ | 8 |
| 2 | $2 \leq x < 4$ | 4 |
| 3 | $1 \leq x < 2$ | 2 |
| 4 | $0 \leq x < 1$ | 1 |

506: High SNR (e.g., greater than 20 dB)

| Beam panic mode | Ratio (x) of UE beam dwell time to quantity of beams pending for scheduling | Down sampling multiplier (M) |
|---|---|---|
| 1 | $x \geq 1$ | 8 |
| 2 | $0.5 \leq x < 1$ | 4 |
| 3 | $0.25 \leq x < 0.5$ | 2 |
| 4 | $0 \leq x < 0.25$ | 1 |

FIG. 5

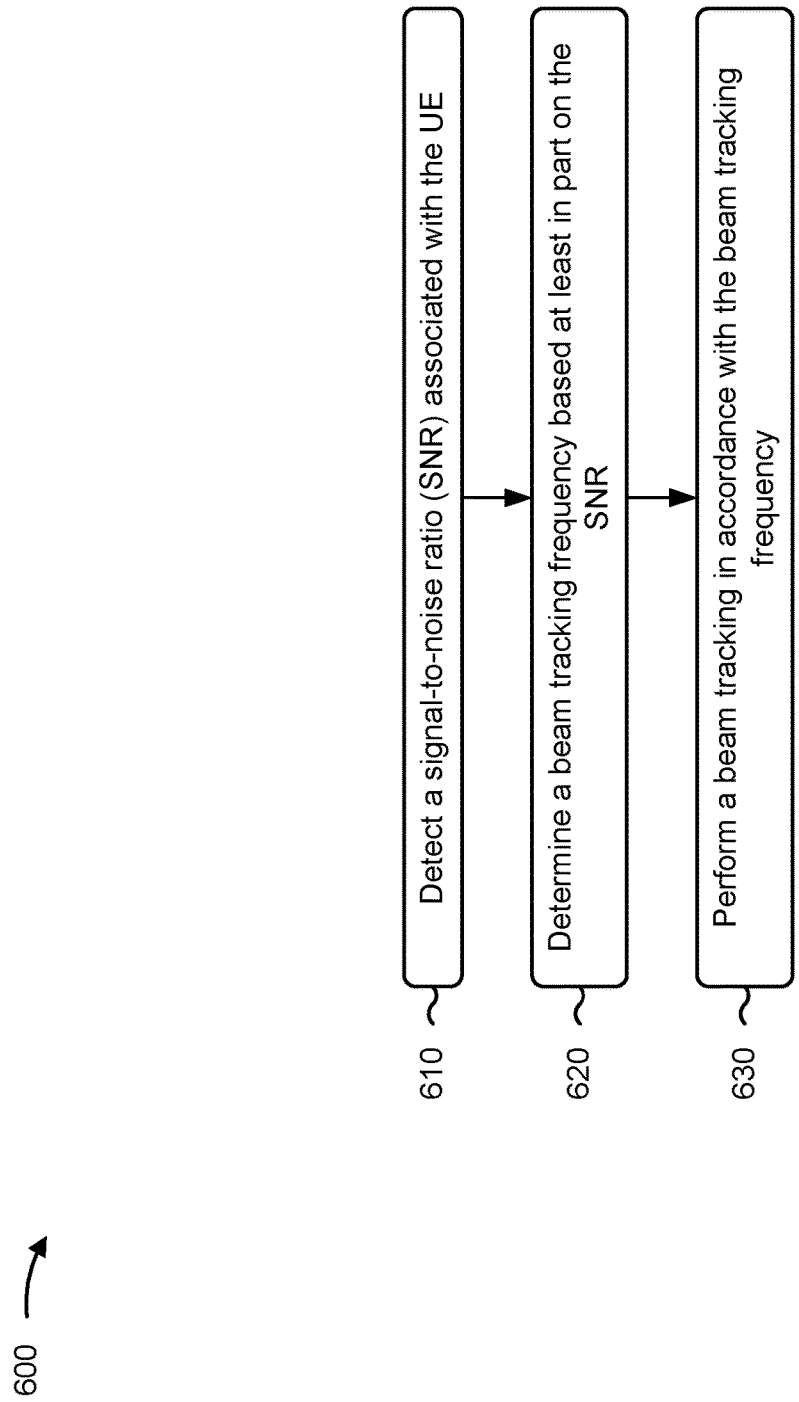

DETERMINING BEAM TRACKING FREQUENCIES USING SIGNAL-TO-NOISE RATIOS ASSOCIATED WITH USER EQUIPMENTS

FIELD OF THE DISCLOSURE

Aspects of the present disclosure generally relate to wireless communication and to techniques and apparatuses for determining beam tracking frequencies using signal-to-noise ratios (SNRs) associated with user equipments (UEs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: detect a signal-to-noise ratio (SNR) associated with the UE; determine a beam tracking frequency based at least in part on the SNR; and perform a beam tracking in accordance with the beam tracking frequency.

In some implementations, a method of wireless communication performed by a UE includes detecting an SNR associated with the UE; determining a beam tracking frequency based at least in part on the SNR; and performing a beam tracking in accordance with the beam tracking frequency.

In some implementations, a non-transitory computer-readable medium storing a set of instructions for wireless communication includes one or more instructions that, when executed by one or more processors of a UE, cause the UE to: detect an SNR associated with the UE; determine a beam tracking frequency based at least in part on the SNR; and perform a beam tracking in accordance with the beam tracking frequency.

In some implementations, an apparatus for wireless communication includes means for detecting an SNR associated with the apparatus; means for determining a beam tracking frequency based at least in part on the SNR; and means for performing a beam tracking in accordance with the beam tracking frequency.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of a lookup table irrespective of a signal-to-noise ratio (SNR) associated with a serving beam, in accordance with the present disclosure.

FIG. 5 is a diagram illustrating examples of lookup tables corresponding to different SNR ranges, in accordance with the present disclosure.

FIG. 6 is a diagram illustrating an example process associated with determining beam tracking frequencies using SNRs associated with UEs, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
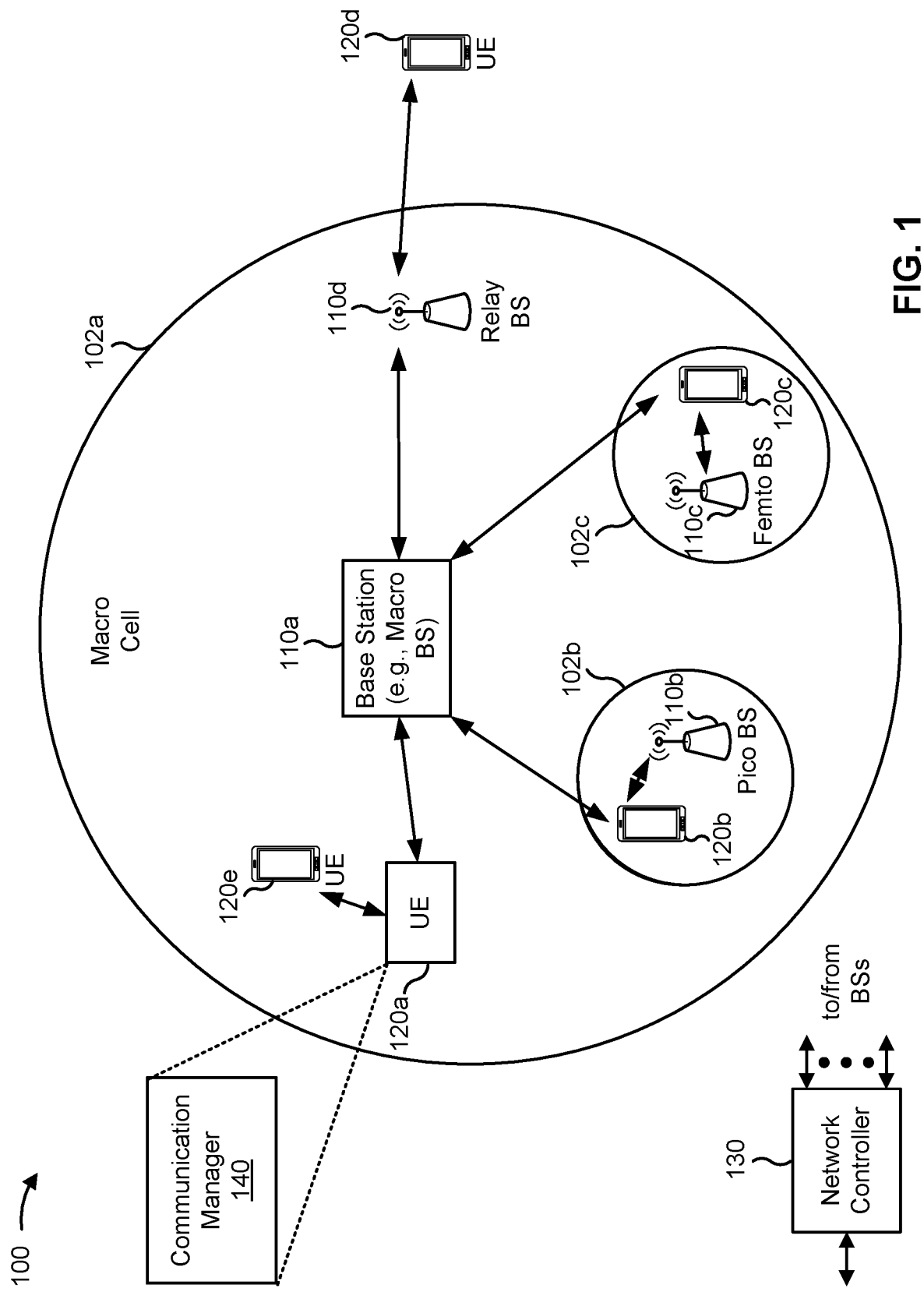
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may detect an SNR associated with the UE; determine a beam tracking frequency based at least in part on the SNR; and perform a beam tracking in accordance with the beam tracking frequency. Additionally, or alternatively, the communication manager 140 may perform one or more other operations described herein.

As indicated above, FIG. 1 is provided as an example. Other examples may differ from what is described with regard to FIG. 1.

Figure 2:
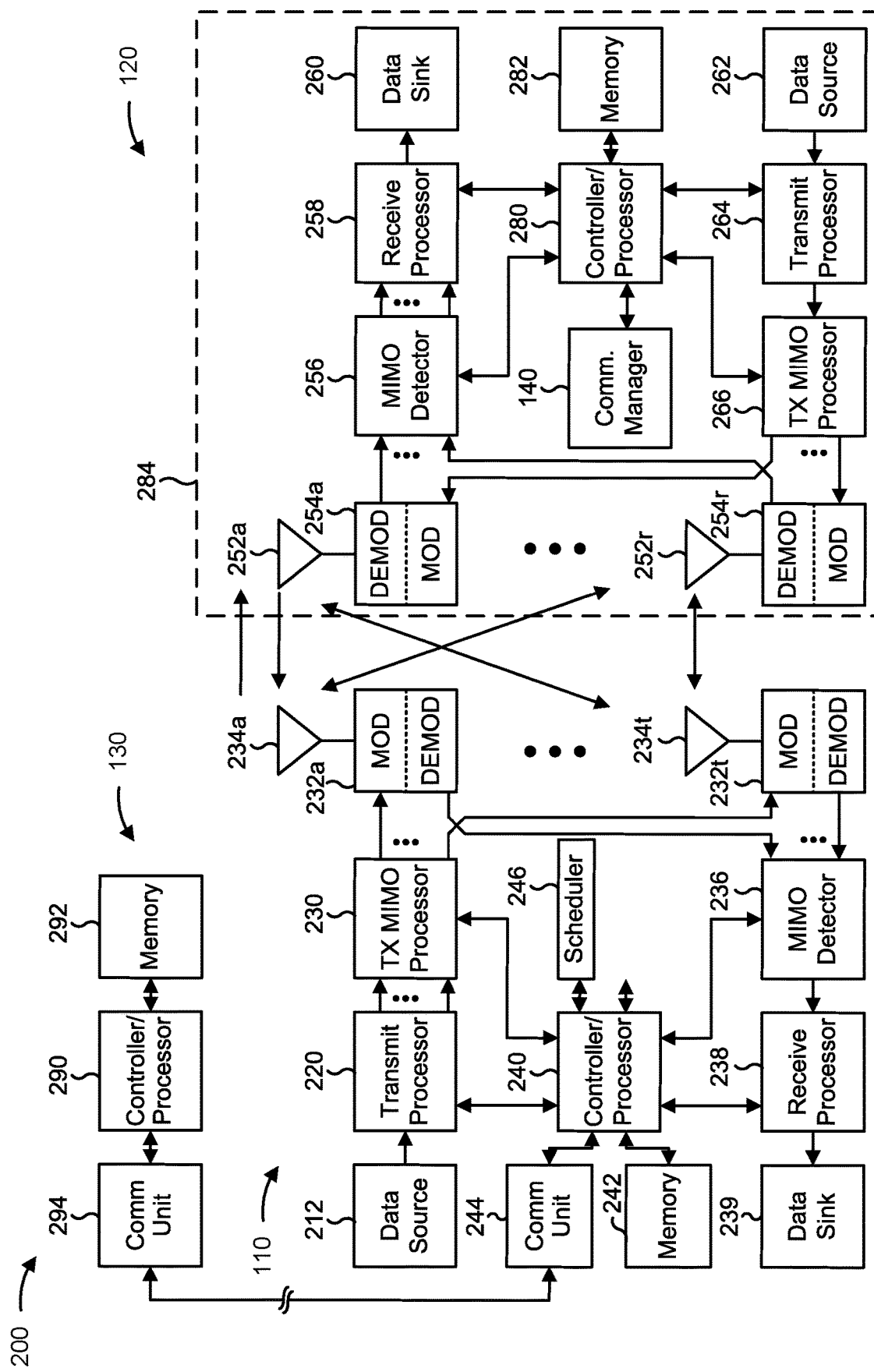
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-6).

The controller/processor 240 of the base station 110, the controller/processor 280 of the UE 120, and/or any other component(s) of FIG. 2 may perform one or more techniques associated with determining beam tracking frequencies using SNRs associated with UEs, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, and/or other processes as described herein. In some examples, executing instructions may include running the instructions, converting the instructions, compiling the instructions, and/or interpreting the instructions, among other examples.

In some aspects, a UE (e.g., UE 120) includes means for detecting an SNR associated with the UE; means for determining a beam tracking frequency based at least in part on the SNR; and/or means for performing a beam tracking in accordance with the beam tracking frequency. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Connected mode discontinuous reception (CDRX) may enable device power savings. With CDRX, a UE may periodically wake up and monitor a downlink channel during an active period (e.g., an on duration), and the UE may enter a sleep mode during an inactive period, thereby conserving battery power. CDRX may be configured with a periodicity and an offset. When CDRX is configured, the UE may adjust a beam tracking frequency to obtain a balance between performance and power savings. A beam tracking may involve the UE performing a beam tracking/sweeping to maintain a radio link between the UE and a base station. A beam tracking with a more frequent periodicity may lead to improved performance but greater power consumption, whereas a beam tracking with a lower periodicity may lead to poorer performance but less power consumption. A frequency of the beam tracking may be adjusted depending on whether the UE is stationary or mobile.

FIG. 3 is a diagram illustrating an example 300 of a lookup table irrespective of an SNR associated with a serving beam, in accordance with the present disclosure.

In past approaches, beam tracking may be scheduled with a frequency of $M*T_{REF}$, depending on a panic mode associated with a UE, where M is a downsampling multiplier and $T_{REF}$ is a nominal period. The panic mode may be associated with a periodicity of beam tracking (e.g., beam tracking every 160 ms, every 80 ms, every 40 ms, or every 20 ms). For a stationary UE, a lower-numbered panic mode may be used since the lower-numbered panic mode may correspond to less frequent beam tracking. For a mobile UE, a higher-numbered panic mode may be used since the higher-numbered panic mode may correspond to more frequent beam tracking. A nominal period $T_{REF}$ may be based at least in part on a synchronization signal/physical broadcast channel block measurement timing configuration (SMTC). For example, the nominal period $T_{REF}$ may be 20 ms. A downsampling multiplier M may be selected from a single lookup table, regardless of an SNR associated with a serving beam.

For example, for a beam panic mode of "1", a ratio (x) of a UE beam dwell time to a quantity of beams pending for scheduling may be "x≥8", and a downsampling multiplier M may be "8". When the nominal period $T_{REF}$ is 20 ms and the downsampling multiplier M is 8, beam tracking may be performed every 160 ms. For a beam panic mode of "2", a ratio of a UE beam dwell time to a quantity of beams pending for scheduling may be "4≤x<8", and a downsampling multiplier M may be "4". When the nominal period $T_{REF}$ is 20 ms and the downsampling multiplier M is 4, beam tracking may be performed every 80 ms. For a beam panic mode of "3", a ratio of a UE beam dwell time to a quantity of beams pending for scheduling may be "2≤x<4", and a downsampling multiplier M may be "2". When the nominal period $T_{REF}$ is 20 ms and the downsampling multiplier M is 2, beam tracking may be performed every 40 ms. For a beam panic mode of "4", a ratio of a UE beam dwell time to a quantity of beams pending for scheduling may be "0≤x<2", and a downsampling multiplier M may be "1". When the nominal period $T_{REF}$ is 20 ms and the downsampling multiplier M is 1, beam tracking may be performed every 20 ms. In the past approaches, the beam tracking was scheduled based at least in part on the single lookup table, irrespective of the SNR associated with the serving beam.

As indicated above, FIG. 3 is provided as an example. Other examples may differ from what is described with regard to FIG. 3.

During CDRX, a UE may perform the beam tracking at a given frequency irrespective of an SNR associated with the UE. For example, the UE may perform the beam tracking at a given frequency irrespective of whether the UE is associated with a relatively high SNR (e.g., favorable radio link conditions) or a relatively low SNR (e.g., unfavorable radio link conditions). As a result, a given frequency at which the UE performs the beam tracking may not optimize power savings and/or performance (e.g., maintaining the radio link) at the UE based at least in part on the SNR associated with the UE.

In various aspects of techniques and apparatuses described herein, a UE (e.g., UE 120) may detect an SNR associated with the UE. The UE may determine a beam tracking frequency based at least in part on the SNR. The UE may access a lookup table associated with an SNR range that includes the SNR associated with the UE. The UE may determine, from the lookup table, a downsampling multiplier associated with a beam panic mode and a ratio of UE beam dwell time to a quantity of beams pending for scheduling. The lookup table may be one of a plurality of lookup tables corresponding to different SNR ranges. The UE may determine the beam tracking frequency based at least in part on the downsampling multiplier and a nominal time period. The UE may perform a beam tracking in accordance with the beam tracking frequency. In some aspects, when CDRX is configured for the UE, the UE may adjust the beam tracking frequency based at least in part on the SNR associated with the UE to obtain a balance between performance and power savings.

In some aspects, during CDRX, when the UE is already associated with the relatively high SNR (e.g., favorable radio link conditions), the UE may forgo some beam tracking opportunities (which may yield a 1-2 dB SNR loss) in order to enter the sleep mode for an extended duration, thereby saving power at the UE. During CDRX, when the UE is associated with the relatively low SNR (e.g., unfavorable radio link conditions), the UE may accelerate beam tracking by using more resources at an expense of consuming more power in order to maintain the radio link for the UE.

Figure 4:
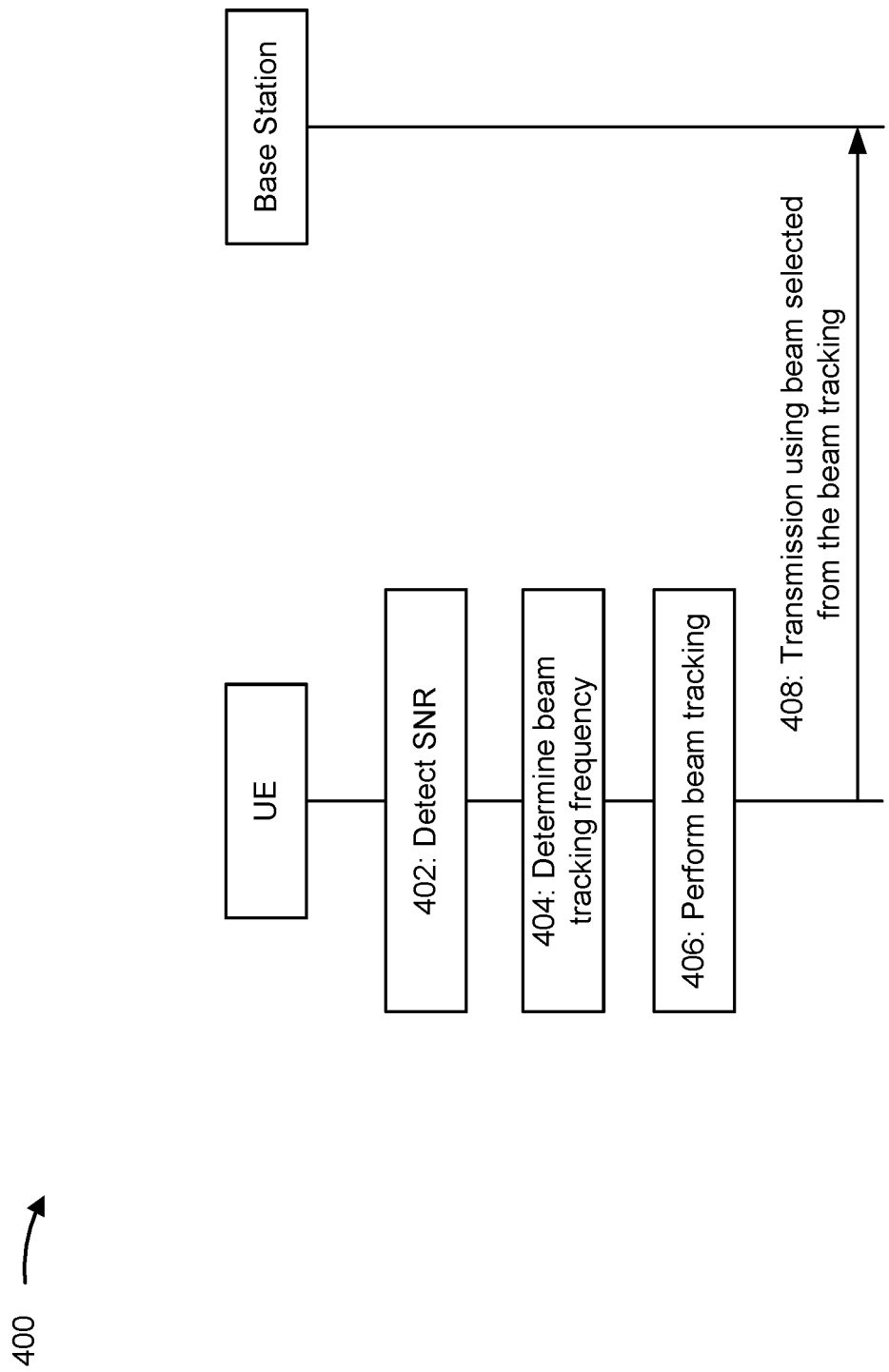
FIG. 4 is a diagram illustrating an example associated with determining beam tracking frequencies using SNRs associated with UEs, in accordance with the present disclosure.

FIG. 4 is a diagram illustrating an example 400 associated with determining beam tracking frequencies using SNRs associated with UEs, in accordance with the present disclosure. As shown in FIG. 4, example 400 includes communication between a UE (e.g., UE 120) and a base station (e.g., base station 110). In some aspects, the UE and the base station may be included in a wireless network, such as wireless network 100.

As shown by reference number 402, the UE may be configured for CDRX and may detect an SNR associated with the UE. The SNR may be associated with a signal received at the UE from a base station. A relatively high SNR may correspond to favorable radio link conditions for the UE (e.g., a radio link quality between the UE and the base station satisfies a threshold). A relatively low SNR may correspond to unfavorable radio link conditions for the UE (e.g., a radio link quality between the UE and the base station does not satisfy a threshold). In some aspects, the SNR may correspond to a serving beam associated with the UE.

As shown by reference number 404, the UE may determine a beam tracking frequency based at least in part on the SNR. The beam tracking frequency may be associated with a beam tracking/sweeping frequency, which may indicate a periodicity at which the UE performs a beam tracking/sweeping. The UE may access a lookup table associated with an SNR range that includes the SNR associated with the UE. The UE may determine, from the lookup table, a downsampling multiplier associated with a beam panic mode and a ratio of UE beam dwell time to a quantity of beams pending for scheduling. The UE may determine the beam tracking frequency based at least in part on the downsampling multiplier and a nominal time period. In some aspects, a lower beam tracking frequency may be associated with an SNR (e.g., a relatively high SNR) associated with power saving, and a higher beam tracking frequency may be associated with an SNR (e.g., a relatively low SNR) associated with maintaining a radio link.

In some aspects, the lookup table may be one of a plurality of lookup tables corresponding to different SNR ranges, where each lookup table may indicate a plurality of beam panic modes, a plurality of corresponding ratios of UE beam dwell times to quantities of beams pending for scheduling, and a plurality of corresponding downsampling multipliers. In some aspects, the beam tracking frequency may be based at least in part on the beam panic mode associated with the UE, and the beam panic mode may be associated with the ratio of UE beam dwell time to the quantity of beams pending for scheduling.

In some aspects, the UE may detect the SNR and access the lookup table associated with the SNR. The SNR may be associated with a serving beam of the UE. For example, when the UE detects a relatively high SNR, the UE may access a lookup table that corresponds to a relatively high SNR range (e.g., greater than 20 dB). As another example, when the UE detects a medium SNR, the UE may access a lookup table that corresponds to a medium SNR range (e.g., 5-20 dB). As yet another example, when the UE detects a relatively low SNR, the UE may access a lookup table that corresponds to a relatively low SNR range (e.g., less than 5 dB). The UE may select, from the lookup table, the beam panic mode based at least in part the ratio of UE beam dwell time to the quantity of beams pending for scheduling. The UE may identify the downsampling multiplier that corresponds to the beam panic mode. The UE may multiply the downsampling multiplier by a nominal period to determine a time duration that corresponds to the beam tracking frequency. For example, the time duration may be 160 ms, 80 ms, 40 ms, 20 ms, etc., which may correspond to a periodicity at which the UE performs the beam tracking. In some aspects, multiple lookup tables corresponding to different SNR ranges may enable an SNR-dependent beam tracking frequency (or an SNR-dependent panic mode) at the UE.

As shown by reference number 406, the UE may perform a beam tracking in accordance with the beam tracking frequency. The UE may perform the beam tracking in accordance with a periodicity (e.g., every 160 ms, every 80 ms, every 40 ms, or every 20 ms), depending on the SNR associated with the UE. During the beam tracking, the UE may perform measurements associated with a plurality of beams, and the UE may select a beam associated with a highest power level as compared to other beams. The UE may select the beam based at least in part on the beam tracking.

As shown by reference number 408, the UE may transmit, to the base station, an uplink transmission using the beam selected during the beam tracking. In other words, the UE may perform the uplink transmission using the beam associated with the highest power level as compared to other beams.

As indicated above, FIG. 4 is provided as an example. Other examples may differ from what is described with regard to FIG. 4.

FIG. 5 is a diagram illustrating examples 500 of lookup tables corresponding to different SNR ranges, in accordance with the present disclosure.

In some aspects, beam tracking may be scheduled with a frequency of $M*T_{REF}$, depending on the panic mode associated with a UE (e.g., UE 120). A nominal period $T_{REF}$ (e.g., 20 ms) may be based at least in part on an SMTC. A downsampling multiplier M may be selected from multiple lookup tables, depending on an SNR associated with a serving beam. Each lookup table may correspond to a particular SNR range. For example, a first lookup table may be associated with an SNR of less than 5 dB. The first lookup table may be associated with a low SNR, which may be less than 5 dB. A second lookup table may be associated with an SNR of greater than 5 dB and less than 20 dB. The second lookup table may be associated with a medium SNR, which may be greater than 5 dB and less than 20 dB. A third lookup table may be associated with an SNR of greater than 20 dB. The third lookup table may be associated with a high SNR, which may be greater than 20 dB.

As shown by reference number 502, for the first lookup table associated with the low SNR, for a beam panic mode of "1", a ratio of a UE beam dwell time to a quantity of beams pending for scheduling may be "x≥8", and a downsampling multiplier M may be "8". For a beam panic mode of "2", a ratio of a UE beam dwell time to a quantity of beams pending for scheduling may be "4≤x<8", and a downsampling multiplier M may be "4". For a beam panic mode of "3", a ratio of a UE beam dwell time to a quantity of beams pending for scheduling may be "2≤x<4", and a downsampling multiplier M may be "2". For a beam panic mode of "4", a ratio of a UE beam dwell time to a quantity of beams pending for scheduling may be "0≤x<2", and a downsampling multiplier M may be "1".

As shown by reference number 504, for the second lookup table associated with the medium SNR, for a beam panic mode of "1", a ratio of a UE beam dwell time to a quantity of beams pending for scheduling may be "x≥4", and a downsampling multiplier M may be "8". For a beam panic mode of "2", a ratio of a UE beam dwell time to a quantity of beams pending for scheduling may be "2≤x<4", and a downsampling multiplier M may be "4". For a beam panic mode of "3", a ratio of a UE beam dwell time to a quantity of beams pending for scheduling may be "1≤x<2", and a downsampling multiplier M may be "2". For a beam panic mode of "4", a ratio of a UE beam dwell time to a quantity of beams pending for scheduling may be "0≤x<1", and a downsampling multiplier M may be "1".

As shown by reference number 506, for the third lookup table associated with the high SNR, for a beam panic mode of "1", a ratio of a UE beam dwell time to a quantity of beams pending for scheduling may be "x≥1", and a downsampling multiplier M may be "8". For a beam panic mode of "2", a ratio of a UE beam dwell time to a quantity of beams pending for scheduling may be "0.5≤x<1", and a downsampling multiplier M may be "4". For a beam panic mode of "3", a ratio of a UE beam dwell time to a quantity of beams pending for scheduling may be "0.25≤x<0.5", and a downsampling multiplier M may be "2". For a beam panic mode of "4", a ratio of a UE beam dwell time to a quantity of beams pending for scheduling may be "0≤x<0.25", and a downsampling multiplier M may be "1".

In some aspects, different lookup tables for different SNR ranges may affect the downsampling multiplier M, thereby causing the beam tracking to be scheduled at a frequency that is based at least in part on the SNR associated with the UE. The UE may access one of the different lookup tables depending on the SNR associated with the UE. When the SNR associated with the UE is low, the UE may follow a performance-based lookup table to maintain a radio link. When the SNR associated with the UE is high, the UE may follow a power-based lookup table to save power. As a result, the UE may apply different frequencies for beam tracking depending on whether the SNR associated with the UE is a high SNR or a low SNR.

In some aspects, a condition for entering a certain beam panic mode may vary depending on the SNR associated with the UE. For example, when the UE is associated with the low SNR, the UE may enter a beam panic mode of "1" when a ratio of UE beam dwell time to a quantity of beams pending for scheduling is greater than 8. However, when the UE is associated with the high SNR, the UE may enter a beam panic mode of "1" when a ratio of UE beam dwell time to a quantity of beams pending for scheduling is greater than 1. As another example, when the UE is associated with the low SNR, the UE may enter a beam panic mode of "4" when a ratio of UE beam dwell time to a quantity of beams pending for scheduling is between 0 and 1. However, when the UE is associated with the high SNR, the UE may enter a beam panic mode of "4" when a ratio of UE beam dwell time to a quantity of beams pending for scheduling is between 0 and 0.25. Thus, the UE may be subjected to more stringent conditions (e.g., more restrictive ratio ranges) for high SNR as compared to low SNR. As a result, the UE may follow a performance-based lookup table for low SNR to maintain a radio link, and the UE may follow a power-based lookup table for high SNR to save power.

As indicated above, FIG. 5 is provided as an example. Other examples may differ from what is described with regard to FIG. 5.

FIG. 6 is a diagram illustrating an example process 600 performed, for example, by a UE, in accordance with the present disclosure. Example process 600 is an example where the UE (e.g., UE 120) performs operations associated with determining beam tracking frequencies using SNRs associated with UEs.

As shown in FIG. 6, in some aspects, process 600 may include detecting an SNR associated with the UE (block 610). For example, the UE (e.g., using communication manager 140 and/or detection component 708, depicted in FIG. 7) may detect an SNR associated with the UE, as described above.

As further shown in FIG. 6, in some aspects, process 600 may include determining a beam tracking frequency based at least in part on the SNR (block 620). For example, the UE (e.g., using communication manager 140 and/or determination component 710, depicted in FIG. 7) may determine a beam tracking frequency based at least in part on the SNR, as described above.

As further shown in FIG. 6, in some aspects, process 600 may include performing a beam tracking in accordance with the beam tracking frequency (block 630). For example, the UE (e.g., using communication manager 140 and/or beam tracking component 712, depicted in FIG. 7) may perform a beam tracking in accordance with the beam tracking frequency, as described above.

Process 600 may include additional aspects, such as any single aspect or any combination of aspects described below and/or in connection with one or more other processes described elsewhere herein.

In a first aspect, process 600 includes accessing a lookup table associated with an SNR range that includes the SNR associated with the UE, determining, from the lookup table, a downsampling multiplier associated with a beam panic mode and a ratio of UE beam dwell time to a quantity of beams pending for scheduling, and determining the beam tracking frequency based at least in part on the downsampling multiplier and a nominal time period.

In a second aspect, alone or in combination with the first aspect, the lookup table is one of a plurality of lookup tables corresponding to different SNR ranges, wherein each lookup table of the plurality of lookup tables indicates a plurality of beam panic modes, a plurality of corresponding ratios of UE beam dwell times to quantities of beams pending for scheduling, and a plurality of corresponding downsampling multipliers.

In a third aspect, alone or in combination with one or more of the first and second aspects, the beam tracking frequency is based at least in part on a beam panic mode associated with the UE, and the beam panic mode is associated with a ratio of UE beam dwell time to a quantity of beams pending for scheduling.

In a fourth aspect, alone or in combination with one or more of the first through third aspects, a lower beam tracking frequency is associated with an SNR associated with power saving, and a higher beam tracking frequency is associated with an SNR associated with maintaining a radio link.

In a fifth aspect, alone or in combination with one or more of the first through fourth aspects, process 600 includes selecting a beam based at least in part on the beam tracking, and transmitting, to a base station, an uplink transmission using the beam.

In a sixth aspect, alone or in combination with one or more of the first through fifth aspects, the SNR corresponds to a serving beam associated with the UE.

In a seventh aspect, alone or in combination with one or more of the first through sixth aspects, the UE is configured for CDRX.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
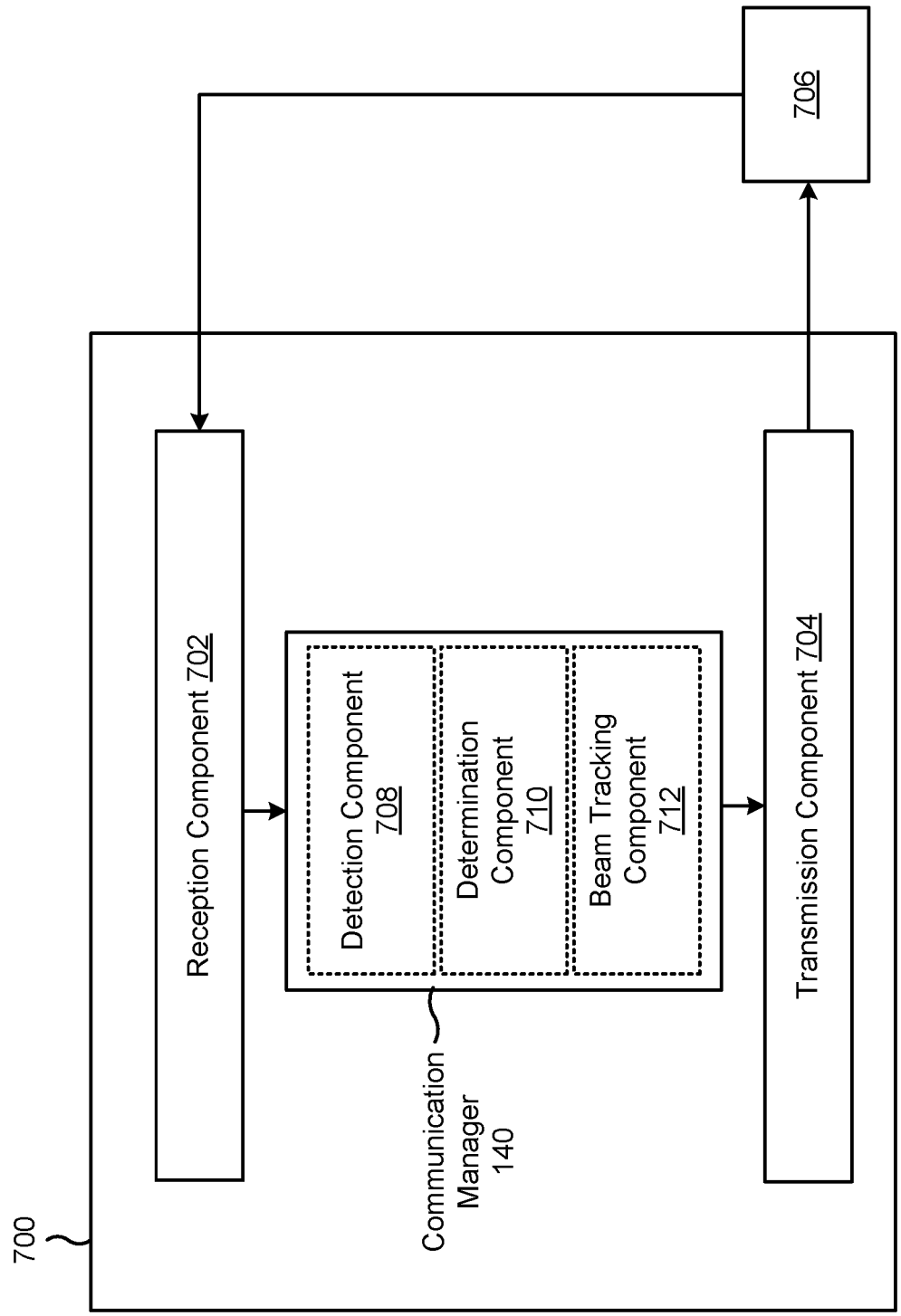
FIG. 7 is a diagram of an example apparatus for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a detection component 708, a determination component 710, or a beam tracking component 712, among other examples.

In some aspects, the apparatus 700 may be configured to perform one or more operations described herein in connection with FIGS. 4-5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The detection component 708 may detect an SNR associated with the UE. The determination component 710 may determine a beam tracking frequency based at least in part on the SNR. The beam tracking component 712 may perform a beam tracking in accordance with the beam tracking frequency. The transmission component 704 may transmit, to a base station, an uplink transmission using a beam selected based at least in part on the beam tracking.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: detecting a signal-to-noise ratio (SNR) associated with the UE; determining a beam tracking frequency based at least in part on the SNR; and performing a beam tracking in accordance with the beam tracking frequency.

Aspect 2: The method of Aspect 1, wherein determining the beam tracking frequency comprises: accessing a lookup table associated with an SNR range that includes the SNR associated with the UE; determining, from the lookup table, a downsampling multiplier associated with a beam panic mode and a ratio of UE beam dwell time to a quantity of beams pending for scheduling; and determining the beam tracking frequency based at least in part on the downsampling multiplier and a nominal time period.

Aspect 3: The method of Aspect 2, wherein the lookup table is one of a plurality of lookup tables corresponding to different SNR ranges, wherein each lookup table of the plurality of lookup tables indicates a plurality of beam panic modes, a plurality of corresponding ratios of UE beam dwell times to quantities of beams pending for scheduling, and a plurality of corresponding downsampling multipliers.

Aspect 4: The method of any of Aspects 1 through 3, wherein the beam tracking frequency is based at least in part on a beam panic mode associated with the UE, and wherein the beam panic mode is associated with a ratio of UE beam dwell time to a quantity of beams pending for scheduling.

Aspect 5: The method of any of Aspects 1 through 4, wherein a lower beam tracking frequency is associated with an SNR associated with power saving, and wherein a higher beam tracking frequency is associated with an SNR associated with maintaining a radio link.

Aspect 6: The method of any of Aspects 1 through 5, further comprising: selecting a beam based at least in part on the beam tracking; and transmitting, to a base station, an uplink transmission using the beam.

Aspect 7: The method of any of Aspects 1 through 6, wherein the SNR corresponds to a serving beam associated with the UE.

Aspect 8: The method of any of Aspects 1 through 7, wherein the UE is configured for connected mode discontinuous reception.

Aspect 9: An apparatus for wireless communication at a device, comprising a processor; memory coupled with the processor; and instructions stored in the memory and executable by the processor to cause the apparatus to perform the method of one or more of Aspects 1-8.

Aspect 10: A device for wireless communication, comprising a memory and one or more processors coupled to the memory, the one or more processors configured to perform the method of one or more of Aspects 1-8.

Aspect 11: An apparatus for wireless communication, comprising at least one means for performing the method of one or more of Aspects 1-8.

Aspect 12: A non-transitory computer-readable medium storing code for wireless communication, the code comprising instructions executable by a processor to perform the method of one or more of Aspects 1-8.

Aspect 13: A non-transitory computer-readable medium storing a set of instructions for wireless communication, the set of instructions comprising one or more instructions that, when executed by one or more processors of a device, cause the device to perform the method of one or more of Aspects 1-8.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
   detect a signal-to-noise ratio (SNR) associated with the UE;

access a lookup table, of a plurality of lookup tables, associated with a SNR range that includes the SNR associated with the UE;

determine, from the lookup table, a downsampling multiplier associated with a beam panic mode and a ratio of UE beam dwell time to a quantity of beams pending for scheduling;

determine a beam tracking frequency based at least in part on the downsampling multiplier and a nominal time period; and perform a beam tracking in accordance with the beam tracking frequency.

2. The apparatus of claim 1, wherein the plurality of lookup tables correspond to different SNR ranges, wherein each lookup table of the plurality of lookup tables indicates a plurality of beam panic modes, a plurality of corresponding ratios of UE beam dwell times to quantities of beams pending for scheduling, and a plurality of corresponding downsampling multipliers.

3. The apparatus of claim 1, wherein the beam tracking frequency is based at least in part on a beam panic mode associated with the UE, and wherein the beam panic mode is associated with a ratio of UE beam dwell time to a quantity of beams pending for scheduling.

4. The apparatus of claim 1, wherein a lower beam tracking frequency is associated with an SNR associated with power saving, and wherein a higher beam tracking frequency is associated with an SNR associated with maintaining a radio link.

5. The apparatus of claim 1, wherein the one or more processors are further configured to:

select a beam based at least in part on the beam tracking; and transmit, to a base station, an uplink transmission using the beam.

6. The apparatus of claim 1, wherein the SNR corresponds to a serving beam associated with the UE.

7. The apparatus of claim 1, wherein the UE is configured for connected mode discontinuous reception.

8. The apparatus of claim 1, wherein the one or more processors, to determine the beam tracking frequency, are further configured to:

determine the beam tracking frequency based at least in part on a result of multiplying the nominal time period by the downsampling multiplier.

9. The apparatus of claim 1, wherein the nominal time period is based at least in part on a synchronization signal block measurement timing configuration or a physical broadcast channel block measurement timing configuration, or a combination thereof.

10. A method of wireless communication performed by a user equipment (UE), comprising:

detecting a signal-to-noise ratio (SNR) associated with the UE;

accessing a lookup table, of a plurality of lookup tables, associated with a SNR range that includes the SNR associated with the UE;

determining, from the lookup table, a downsampling multiplier associated with a beam panic mode and a ratio of UE beam dwell time to a quantity of beams pending for scheduling;

determining a beam tracking frequency based at least in part on the downsampling multiplier and a nominal time period; and performing a beam tracking in accordance with the beam tracking frequency.

11. The method of claim 10, wherein the plurality of lookup tables correspond to different SNR ranges, wherein each lookup table of the plurality of lookup tables indicates a plurality of beam panic modes, a plurality of corresponding ratios of UE beam dwell times to quantities of beams pending for scheduling, and a plurality of corresponding downsampling multipliers.

12. The method of claim 10, wherein the beam tracking frequency is based at least in part on a beam panic mode associated with the UE, and wherein the beam panic mode is associated with a ratio of UE beam dwell time to a quantity of beams pending for scheduling.

13. The method of claim 10, wherein a lower beam tracking frequency is associated with an SNR associated with power saving, and wherein a higher beam tracking frequency is associated with an SNR associated with maintaining a radio link.

14. The method of claim 10, further comprising:

selecting a beam based at least in part on the beam tracking; and transmitting, to a base station, an uplink transmission using the beam.

15. The method of claim 10, wherein the SNR corresponds to a serving beam associated with the UE.

16. The method of claim 10, wherein the UE is configured for connected mode discontinuous reception.

17. The method of claim 10, wherein determining the beam tracking frequency comprises:

determining the beam tracking frequency based at least in part on a result of multiplying the nominal time period by the downsampling multiplier.

18. The method of claim 10, wherein the nominal time period is based at least in part on a synchronization signal block measurement timing configuration or a physical broadcast channel block measurement timing configuration, or a combination thereof.

19. A non-transitory computer-readable medium storing a set of instructions for wireless communication, the set of instructions comprising:

one or more instructions that, when executed by one or more processors of a user equipment (UE), cause the UE to:

detect a signal-to-noise ratio (SNR) associated with the UE;

access a lookup table, of a plurality of lookup tables, associated with a SNR range that includes the SNR associated with the UE;

determine, from the lookup table, a downsampling multiplier associated with a beam panic mode and a ratio of UE beam dwell time to a quantity of beams pending for scheduling;

determine a beam tracking frequency based at least in part on the downsampling multiplier and a nominal time period; and perform a beam tracking in accordance with the beam tracking frequency.

20. The non-transitory computer-readable medium of claim 19, wherein the plurality of lookup tables correspond to different SNR ranges, wherein each lookup table of the plurality of lookup tables indicates a plurality of beam panic modes, a plurality of corresponding ratios of UE beam dwell times to quantities of beams pending for scheduling, and a plurality of corresponding downsampling multipliers.

21. The non-transitory computer-readable medium of claim 19, wherein the beam tracking frequency is based at least in part on a beam panic mode associated with the UE, and wherein the beam panic mode is associated with a ratio of UE beam dwell time to a quantity of beams pending for scheduling.

22. The non-transitory computer-readable medium of claim 19, wherein a lower beam tracking frequency is associated with an SNR associated with power saving, and wherein a higher beam tracking frequency is associated with an SNR associated with maintaining a radio link.

23. The non-transitory computer-readable medium of claim 19, wherein the one or more instructions further cause the UE to:
 select a beam based at least in part on the beam tracking; and
 transmit, to a base station, an uplink transmission using the beam.

24. The non-transitory computer-readable medium of claim 19, wherein the SNR corresponds to a serving beam associated with the UE, and wherein the UE is configured for connected mode discontinuous reception.

25. An apparatus for wireless communication, comprising:
 means for detecting a signal-to-noise ratio (SNR) associated with the apparatus;
 means for accessing a lookup table, of a plurality of lookup tables, associated with a SNR range that includes the SNR associated with the apparatus;
 means for determining, from the lookup table, a downsampling multiplier associated with a beam panic mode and a ratio of apparatus beam dwell time to a quantity of beams pending for scheduling;
 means for determining a beam tracking frequency based at least in part on the downsampling multiplier and a nominal time period; and
 means for performing a beam tracking in accordance with the beam tracking frequency.

26. The apparatus of claim 25, wherein the plurality of lookup tables correspond to different SNR ranges, wherein each lookup table of the plurality of lookup tables indicates a plurality of beam panic modes, a plurality of corresponding ratios of apparatus beam dwell times to quantities of beams pending for scheduling, and a plurality of corresponding downsampling multipliers.

27. The apparatus of claim 25, wherein the beam tracking frequency is based at least in part on a beam panic mode associated with the apparatus, and wherein the beam panic mode is associated with a ratio of apparatus beam dwell time to a quantity of beams pending for scheduling.

28. The apparatus of claim 25, wherein a lower beam tracking frequency is associated with an SNR associated with power saving, and wherein a higher beam tracking frequency is associated with an SNR associated with maintaining a radio link.

29. The apparatus of claim 25, further comprising:
 means for selecting a beam based at least in part on the beam tracking; and
 means for transmitting, to a base station, an uplink transmission using the beam.

30. The apparatus of claim 25, wherein the SNR corresponds to a serving beam associated with the apparatus, and wherein the apparatus is configured for connected mode discontinuous reception.

* * * * *